(12) United States Patent
Baechle (10) Patent No.: US 12,145,583 B2
(45) Date of Patent: Nov. 19, 2024

(54) METHOD FOR OPERATING A DRIVER ASSISTANCE FUNCTION TO SUPPORT A LATERAL CONTROL OF A VEHICLE, AND CONTROL UNIT FOR A DRIVER ASSISTANCE SYSTEM

(71) Applicant: Robert Bosch GmbH, Stuttgart (DE)

(72) Inventor: Thomas Baechle, Flein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 249 days.

(21) Appl. No.: 17/739,386

(22) Filed: May 9, 2022

(65) Prior Publication Data

US 2023/0020048 A1 Jan. 19, 2023

(30) Foreign Application Priority Data

Jul. 8, 2021 (DE) .................. 10 2021 207 228.3

(51) Int. Cl.
*B60W 30/12* (2020.01)
*B60W 40/09* (2012.01)

(52) U.S. Cl.
CPC ............ *B60W 30/12* (2013.01); *B60W 40/09* (2013.01); *B60W 2510/0638* (2013.01); *B60W 2510/202* (2013.01); *B60W 2520/125* (2013.01); *B60W 2552/53* (2020.02)

(58) Field of Classification Search
CPC ...... B60W 30/12; B60W 30/14; B60W 30/16; B60W 40/105; B60W 40/107; B60W 40/109
See application file for complete search history.

(56) References Cited

U.S. PATENT DOCUMENTS

| 6,134,491 A | * | 10/2000 | Kawagoe | ............... B62D 1/286 701/80 |
| 2005/0027402 A1 | * | 2/2005 | Koibuchi | .......... B60W 30/1819 701/1 |
| 2018/0281848 A1 | * | 10/2018 | Zegelaar | ............. B62D 15/024 |

(Continued)

FOREIGN PATENT DOCUMENTS

| DE | 10137292 A1 | 3/2003 |
| DE | 60105708 T2 | 9/2005 |

(Continued)

*Primary Examiner* — John Kwon
(74) *Attorney, Agent, or Firm* — NORTON ROSE FULBRIGHT US LLP; Gerard A. Messina (57) ABSTRACT

A method for operating a driver assistance function to support a lateral control of a vehicle is provided. A permissible range for a steering torque component which the driver assistance function is able to exert on the steering of the vehicle is predefined. The permissible range is specified by upper and lower limits. The upper and lower limits of the permissible range be adapted as a function of a current vehicle state. The vehicle state is given relative to a lane center, for example, by the position, the velocity, the acceleration and the sudden motion, by the respective component of this variable in the lateral direction. An adjustable range of the driver feedback is determined based on the vehicle state and the lateral acceleration. From this and the consideration of a disturbance compensation, the permissible range of the steering torque component of the assistance function is ascertained.

21 Claims, 8 Drawing Sheets

(56) References Cited

U.S. PATENT DOCUMENTS

| | | | | |
|---|---|---|---|---|
| 2019/0135334 A1* | 5/2019 | Itamoto | | B62D 15/025 |
| 2020/0108866 A1* | 4/2020 | Lapis | | B62D 9/002 |
| 2020/0164919 A1* | 5/2020 | Cotter | | B60R 1/26 |
| 2021/0024123 A1* | 1/2021 | Vizer | | B62D 5/006 |

FOREIGN PATENT DOCUMENTS

| | | |
|---|---|---|
| DE | 102005004727 A1 | 8/2006 |
| DE | 102006060628 A1 | 6/2008 |
| DE | 102019203040 A1 | 9/2020 |

* cited by examiner

METHOD FOR OPERATING A DRIVER ASSISTANCE FUNCTION TO SUPPORT A LATERAL CONTROL OF A VEHICLE, AND CONTROL UNIT FOR A DRIVER ASSISTANCE SYSTEM

CROSS REFERENCE

The present application claims the benefit under 35 U.S.C. § 119 of German Patent Application No. DE 10 2021 207 228.3 filed on Jul. 8, 2021, which is expressly incorporated herein by reference in its entirety.

FIELD

The present invention relates to a method for operating a driver assistance function to support a lateral control of a vehicle. The present invention also relates to a control unit for a driver assistance system which is developed to carry out a method according to the present invention. In addition, the present invention pertains to a driver assistance system for a vehicle. The present invention furthermore relates to a computer program.

BACKGROUND INFORMATION

In connection with a lane-keeping system, German Patent Application No. DE 10 2005 004 727 A1 describes that, among other things, the steering support for maintaining a setpoint lane depends on vehicle state parameters such as the linear vehicle velocity, the vehicle longitudinal acceleration, the lateral vehicle velocity, the lateral vehicle acceleration, the vehicle yaw rate, the vehicle yaw acceleration and/or the vehicle side-slip angle.

In German Patent Application No. DE 101 37 292 A1, it is described that in a driver assistance system featuring power-assisted steering, current movement data of the vehicle are acquired or estimated and compared to a predefined trajectory in order to actuate a steering wheel support as a function of the comparison.

German Patent Application No. DE 10 2006 060 628 A1 describes using an optical system for ascertaining the traffic lane and the relative position of the vehicle with respect to the traffic lane, in particular a lateral offset and the orientation with respect to the traffic lane. In addition, state variables regarding the linear and lateral dynamics of the vehicle, for example, are forwarded to a control unit which includes a lane-keeping function.

Modern vehicles increasingly use driver assistance functions to support the lateral guidance of the vehicle, e.g., lane-keeping assistants and lane-centering assistance systems. In most cases, they are based on electrical power steering systems (ESP) which use what is referred to as a steering torque offset as a controlled variable. With the aid of this steering torque offset, a steering torque component is available which may be utilized to modify the steering angle and thus the vehicle position. A driver is able to perceive this steering torque offset (steering torque component) as a superposition to the handing of the vehicle during manual driving (basic steering feel).

In particular if greater automatization degrees of vehicles are involved (e.g., of level 2 or higher according to SAE), the driver assistance functions may have a cooperative character. If the driver desires a trajectory correction, then the driver assistance function is able to be oversteered at any time using a low force at the steering wheel without the function being deactivated by this intervention. However, in such cases the driver should be made to understand the difference between a manually driven trajectory and the setpoint trajectory of the assistance functions by a selectively influenced steering torque component (driver feedback).

To ensure that the driver is capable of controlling the driving operation, the steering torque component is normally restricted to a constant range of controllable steering torques, the range being given by a maximum and a minimum value. This is referred to as the controllable steering torque range in the following text. The driver assistance function may use this often symmetrical range for the vehicle guidance. If a lane deviation occurs by a driver intervention, for instance, then the driver assistance function increases the steering torque component up to the limits of this controllable range in an effort to keep the vehicle on course.

However, the time curve of this increase in the steering torque component may not be suitable for achieving a defined driver feedback with regard to a difference from the setpoint trajectory of the driver assistance function. In addition, the superposition of a basic steering feel by the steering torque component of the driver assistance function may lead to driver feedback that distinguishes between straight-ahead driving and cornering and thus is perceived as inconsistent.

SUMMARY

It is an object of the present invention to achieve defined driver feedback at the steering wheel for the purpose of illustrating to the driver the driving situation relative to the cooperative driver assistance system.

According to a first aspect of the present invention, a method is provided for operating a driver assistance function to support a lateral control of a vehicle. In accordance with an example embodiment of the present invention, a permissible range for a steering torque component is predefined which the driver assistance function may exert on the steering of the vehicle. This permissible range is predefined within a controllable range for a steering torque component that the driver assistance function is able to exert on the steering of the vehicle. The permissible range is specified by an upper limit and a lower limit. These limits are also denoted as restrictions for a driver feedback. According to an example embodiment of the present invention, the upper and the lower limits are adapted as a function of a current vehicle state. In this way, the permissible range is determined starting from a desired range for a steering torque applied by the driver assistance-function that serves as driver feedback.

More specifically, based on the vehicle state and the lateral acceleration, an adjustable range of the driver feedback is determined. The permissible range of the steering torque component of the assistance function is particularly ascertained on this basis under consideration of a disturbance compensation.

The vehicle state, for instance relative to a lane center, is given by the position, the velocity, the acceleration and the sudden motion, in particular by the respective component of these variables in the lateral direction.

In one example embodiment of the present invention, an adjustable modification of the lower and the upper limit of the permissible range and/or of a resulting range of the driver feedback takes place as a function of the current vehicle position relative to the lane center. For instance, this is done in such a way that an amount of the maximum driver feedback also increases via an increasing distance from the lane center. After an initial increase, it is alternatively also possible to generate again falling values for the upper and lower limits of the driver feedback and thus for the permissible range. This advantageously makes it possible to restrict a maximum driver feedback for very large trajectory deviations.

In a further example embodiment of the present invention, the adaptation of the upper and the lower limit of the permissible range or of a resulting range of the driver feedback is implemented as a function of the current distance from the lane center in such a way that the maximally adjusted values for the upper and lower limits are made available whenever the outer wheels of the vehicle sit on the outer marking of the traffic lane. In an advantageous manner, an automatic adaptation to the lane width of the road may thus take place in such a way that the generally available space on the sides is taken into account. At a given distance, a lower maximum driver feedback consequently results on wide lanes such as on an expressway than on narrower highways. Especially when the control activity of the driver is limited, this makes it possible to achieve greater robustness of the driver assistance functions on roads that have a narrower width.

In a further example embodiment of the present invention, the current velocity of the vehicle relative to the lane center is alternatively or additionally taken into account to achieve the adaptation of the upper and the lower limit of the permissible range or a resulting range of the driver feedback. The lateral relative velocity (lateral velocity) is able to be calculated from the current angle of the vehicle relative to the road and the linear velocity, for example. A numerical differentiation of the position may be implemented as an alternative. If the driver overrules the driver assistance function by an intervention at the steering wheel, this adaptation of the upper and lower limit of the permissible range for a steering torque component which the driver assistance function is able to exert on the steering of the vehicle causes the maximum driver feedback to rise in proportion to the rapidity of the driver intervention. Apart from that, there is also a greater potential for the driver assistance function to correct disturbances in this embodiment because the values of the limits of the permissible range are already able to be increased in the vicinity of the lane center. In particular in a case where the control activity of the driver is limited, this also makes it possible to achieve greater robustness of the driver assistance function.

As an alternative or in addition, in a further example embodiment of the present invention, the acceleration of the vehicle relative to the lane center is taken into account for adapting the upper and lower limit of the permissible range or a resulting range of the driver feedback. For example, this relative lateral acceleration may be determined from the curvature of the road, the yaw rate and the linear velocity of the vehicle, for instance. A numerical differentiation of the velocity is able to be implemented as an alternative. If there is a difference between the currently traveled lateral acceleration and the lateral acceleration required to stay on course in the lane center, then an amount-wise increase in the range of the driver feedback, and thus of the upper limit and the lower limits for the steering torque component which the driver assistance function may exert on the steering of the vehicle, provides greater maximum driver feedback on the one hand and also a greater potential for the driver assistance function on the other hand. This also results in greater robustness of the driver assistance function, especially in a case of limited control activity of the driver.

In a further example embodiment of the present invention, the sudden motion of the vehicle relative to the lane center is additionally taken into account for adapting the range for the driver feedback and thus the upper and lower limit of the permissible range. This lateral relative sudden motion is able to be determined from the change in curvature of the road and the linear velocity of the vehicle as well as from a statistical single-track model and the velocity. A numerical differentiation of the acceleration may be performed as an alternative. If there is a difference between the currently driven sudden motion and the sudden motion required to follow the lane center, then an amount-wise increase in the permissible range and thus in the driver feedback allows for greater driver feedback on the one hand and also a greater potential for the driver assistance function on the other hand. In particular in the case of limited control activity of the driver, this also results in greater robustness of the driver assistance function.

In a further example embodiment of the present invention, the involvement of the driver in controlling the driving task is alternatively or additionally taken into account when adapting the permissible range. In particular if limited control activity of the driver is present, a change to a separate mode of the driver assistance function may take place. In this mode, the values for the upper and lower limit of the permissible range for the steering torque component which the driver assistance function may exert on the steering of the vehicle is specified independently of the current vehicle state, that is, in particular independently of a current position, velocity, acceleration or sudden motion of the vehicle relative to a lane center, and especially is able to be freely specified.

A transition from the separate mode back to a normal operation of the driver assistance function is able to take place as soon as a greater control activity of the driver is present, for instance. An adjustable time window and an activation threshold are preferably used for the transitions to increase the robustness with regard to sensor noise and road irregularities. The control activity of the driver is able to be estimated, e.g., by the measured torsion bar torque of the ESP.

To enable a consistent driver feedback also during cornering, the limits of the permissible range in one possible embodiment of the present invention are additionally able to be modified by a disturbance feedforward control.

The permissible range for the steering torque component of the assistance function is able to be determined from the range for the desired driver feedback at the steering wheel given by the vehicle state. In a conventional selection of the algebraic signs, the lower limit of the range of the driver feedback defines the upper limit of the permissible range, and vice versa. The compensation of a disturbance variable in the form of the basic steering feel of the vehicle is advantageous in addition, the basic steering feel resulting from the firm gear coupling and the application of the steering assistance of the driver assistance function in conjunction with the rack gear force. In steady-state driving situations, this is given by the lateral acceleration, in particular, and further effects are provided by a lateral inclination of the roadway.

The basic steering feel as a function of the vehicle velocity, for example, is known from a stored characteristic map or on the basis of a computing model. The driver feedback at the steering wheel in general results from the superposition of the steering torque component of the assistance function and the basic steering feel. Since the resulting overall steering torque is decisive for the subjective assessment of the driver feedback, many drivers perceive a direct superposition of the steering torque components without further measures as inconsistent. Thus, a correction of the permissible range by the basic steering feel in the form of a disturbance compensation may be carried out in order to allow for a configuration of the additional steering torque component with regard to the desired driver feedback. The representation of the basic steering feel is able to be stored as a characteristic map as a function of the vehicle velocity so that the likewise velocity-dependent adjustment of the electrical steering system (ESP) may be taken into account.

In a further example embodiment of the present invention, the representation of the basic steering feel is not implemented using a fixed characteristic map but by an estimated variable learned while driving. To this end, the non-linear basic steering feel may be transformed to a linear intermediate plane, e.g., the gear rack force, and described there as a first degree polynomial as a model. The parameters of this model, for instance, are estimated by a recursive least squares approach, evaluated at the current lateral acceleration, transformed back into the non-linear representation, and then used for the disturbance compensation in the method according to the present invention.

According to a further aspect of the present invention, a control unit for a driver assistance system of a vehicle is provided, the control unit being designed to initiate, carry out, control and/or regulate a driver assistance method according to the present invention.

In addition, a driver assistance system for a vehicle as such is also a subject matter of the present invention, the driver assistance system being set up to initiate, execute, control and/or regulate a driver assistance method according to the present invention, and/or the driver assistance system having a control unit which is configured according to the present invention or has an operative connection to a control unit configured according to the present invention.

The present invention is based on the feature of ascertaining additional restrictions, dependent on the driving situation, of the steering torque component of a driver assistance function for the lateral control of a vehicle, the restrictions moving within a controllable range. A defined driver feedback is possible via these variables, which are also denoted as a permissible range. To this end, this permissible range is adapted as a function of a vehicle state relative to a setpoint trajectory predefined by the driver assistance function, e.g., the center of the lane.

The present invention may particularly provide the following advantages:

The restrictions of the steering torque component adjustable independently of the driver assistance function according to the present method allow for a broad separation of the driver feedback and the driver assistance function. As a result, the latter may primarily be geared toward the best possible trajectory guidance and the compensation of disturbances and route uncertainties, which provides advantages in terms of robustness.

The method according to the present invention gives the driver assistance function a potential that is adapted to the driving situation in that the permissible range for a steering torque component which the driver assistance function is able to exert on the steering of the vehicle is adapted as a function of the vehicle state. If a greater disturbance has occurred, e.g., caused by a short-term driver intervention, the driver assistance function thus is capable of transferring the vehicle back to the setpoint state of the assistance function within the framework of the controllable steering torque range.

The adjustment possibilities of the method according to the present invention allow for a selective adaptation of the driver feedback especially regarding the currently driven lateral acceleration. This particularly makes it possible to adapt the driver feedback with a multitude of degrees of freedom as a function of the driving situation.

The disturbance feedforward control enables an extensive decoupling of the driver feedback from the lateral acceleration and other steering torque components. It is therefore possible to generate a consistent driver feedback in assisted cooperative driving.

BRIEF DESCRIPTION OF THE DRAWINGS

Example embodiments of the present invention are described in detail with reference to the figures.

DETAILED DESCRIPTION OF EXAMPLE EMBODIMENTS

In the following description of the exemplary embodiments of the present invention, identical elements are denoted by identical reference numerals, and a repeated description of these elements is dispensed with, as the case may be. The figures depict the subject matter of the present invention merely schematically.

Figure 1A:
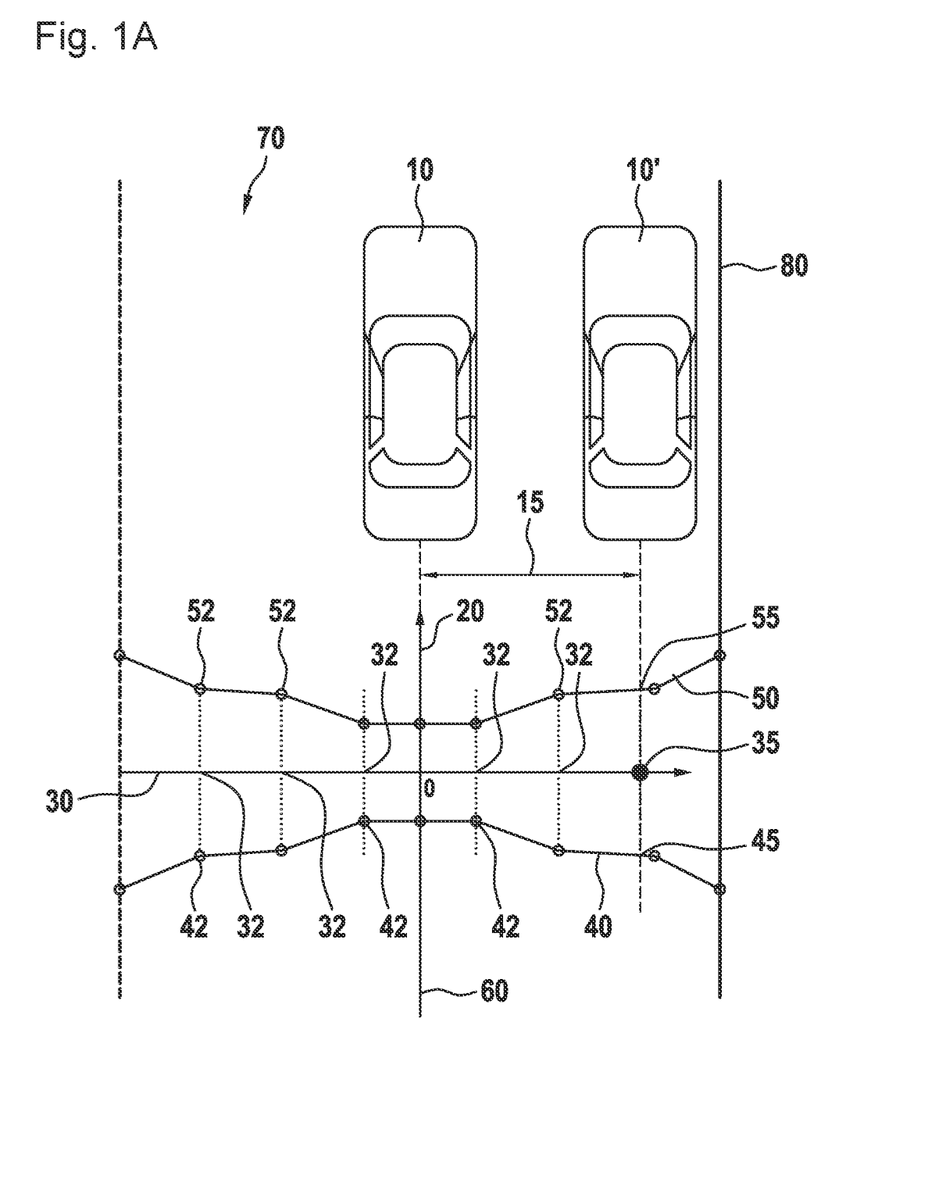
FIGS. 1A-1D show different driving situations in which a vehicle drives at an offset from a lane center, as well as a desired range for the driver feedback predefined according to an exemplary embodiment of the present invention.

FIG. 1A shows a vehicle 10 which moves in the center of a traffic lane 70. The traffic lane has a right boundary line 80. Vehicle 10 includes a driver assistance system (not shown) to support a lateral control of a vehicle 10. A permissible range for a steering torque component which the driver assistance function is able to exert on the steering of the vehicle is predefined for the driver assistance function and specified by an upper limit and a lower limit. This permissible range is specified within a controllable range for a steering torque component that the driver assistance function can exert on the steering of the vehicle.

In the present example, upper limit 50 and lower limit 40 are adapted as a function of a current position of vehicle 10 relative to a lane center 60. This is shown in the diagram below the vehicle. The x-axis represents the current position of vehicle 10, measured in centimeters, for example. The position featuring the zero value denotes lane center 60. The y-axis represents a steering torque component that the driver assistance function is able to exert on the steering of vehicle 10 at the respective position 30, measured in Nm, for instance.

Curve 50 describes the upper limit for this steering torque component as a function of the current position of vehicle 10, and curve 40 describes a lower limit for the steering torque component as a function of the current position of vehicle 10. Thus, the permissible range for the steering torque component lies between the two curves 40 and 50 as a function of the current position of vehicle 10 relative to lane center 60.

The upper and lower limits consequently represent an adjustable modification of the permissible range as a function of the vehicle position relative to the lane center. In this example, this is done in such a way that the amount of the driver feedback also increases across an increasing distance 15 from lane center 60. Thus, the values of the upper and lower limits are lowest whenever vehicle 10 is located in lane center 60. This means that the driver assistance function may exert only a relatively small steering torque component in this position and the counter-torque felt by the driver when maintaining the lateral position is relatively low.

If the position of vehicle 10' deviates from the lane center, as illustrated by vehicle position 35 in FIG. 1A by way of example, where vehicle 10' is positioned at a distance 15 at an offset from the lane center, the driver feedback, that is, respective values 45, 55 of upper limit 50 and lower limit 40, is greater in comparison with a smaller distance from lane center 60. The values of upper limit 50 and lower limit 40 thus increase with the distance of vehicle 10 from lane center 60.

The functions indicated by the upper or lower limit 50, 40 for the permissible range for a steering torque component which the driver assistance function is able to exert on the steering of the vehicle as a function of relative position 30 of vehicle 10 with respect to lane center 60 are able to be predefined, e.g., in the form of different interpolation points 42, 52 for certain allocated positions 32, and upper limit 50 and lower limit 40 are linearly interpolated for the intermediate positions. As an alternative, a polynomial may be predefined as a model, for example. Other representations of the functions for upper and/or lower limit 50, 40 are possible and would be understood by one skilled in the art in view of the disclosure herein.

Figure 1B:
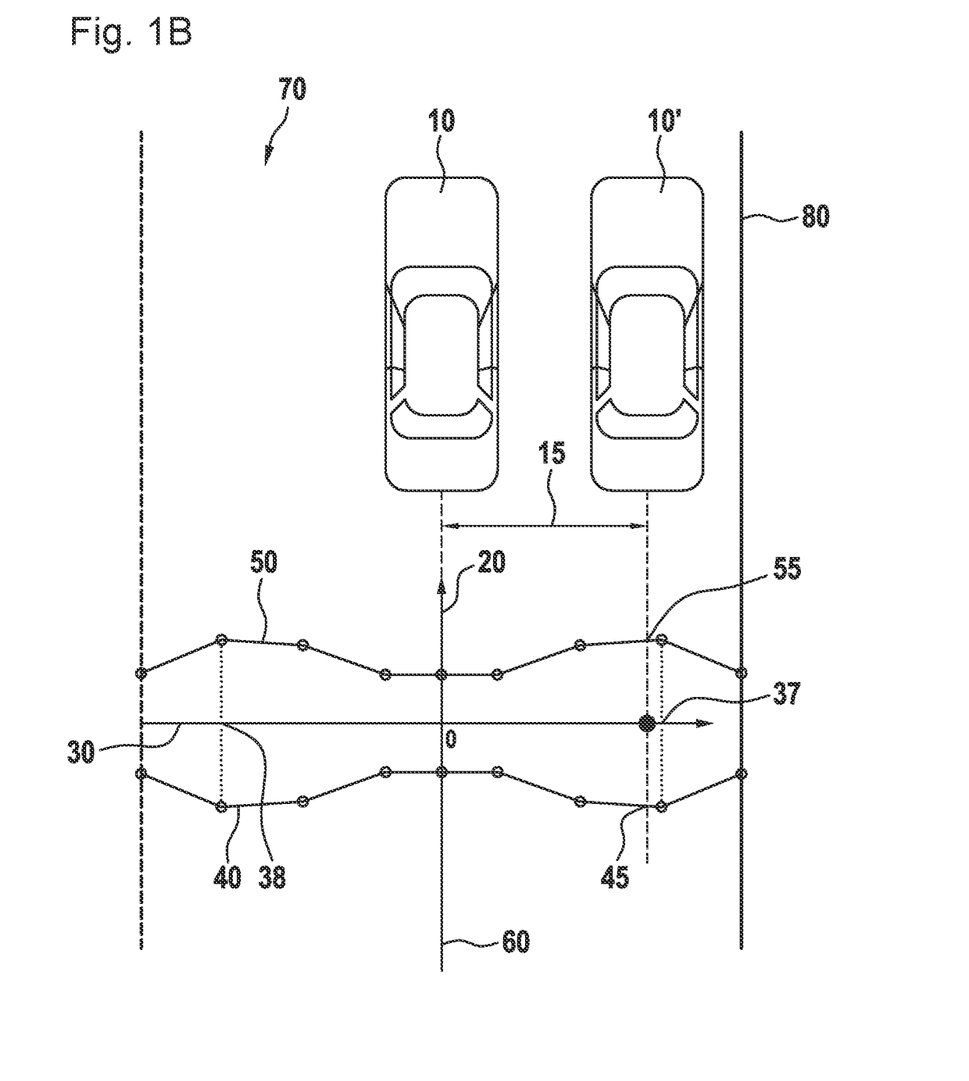

In an alternative embodiment shown in FIG. 1B, after an initial increase up to a position 37 or position 38, upper limit 50 and lower limit 40 and thus the driver feedback drop again in terms of their values. This makes it possible to restrict the maximum driver feedback for very large trajectory deviations 15.

Figure 1C:
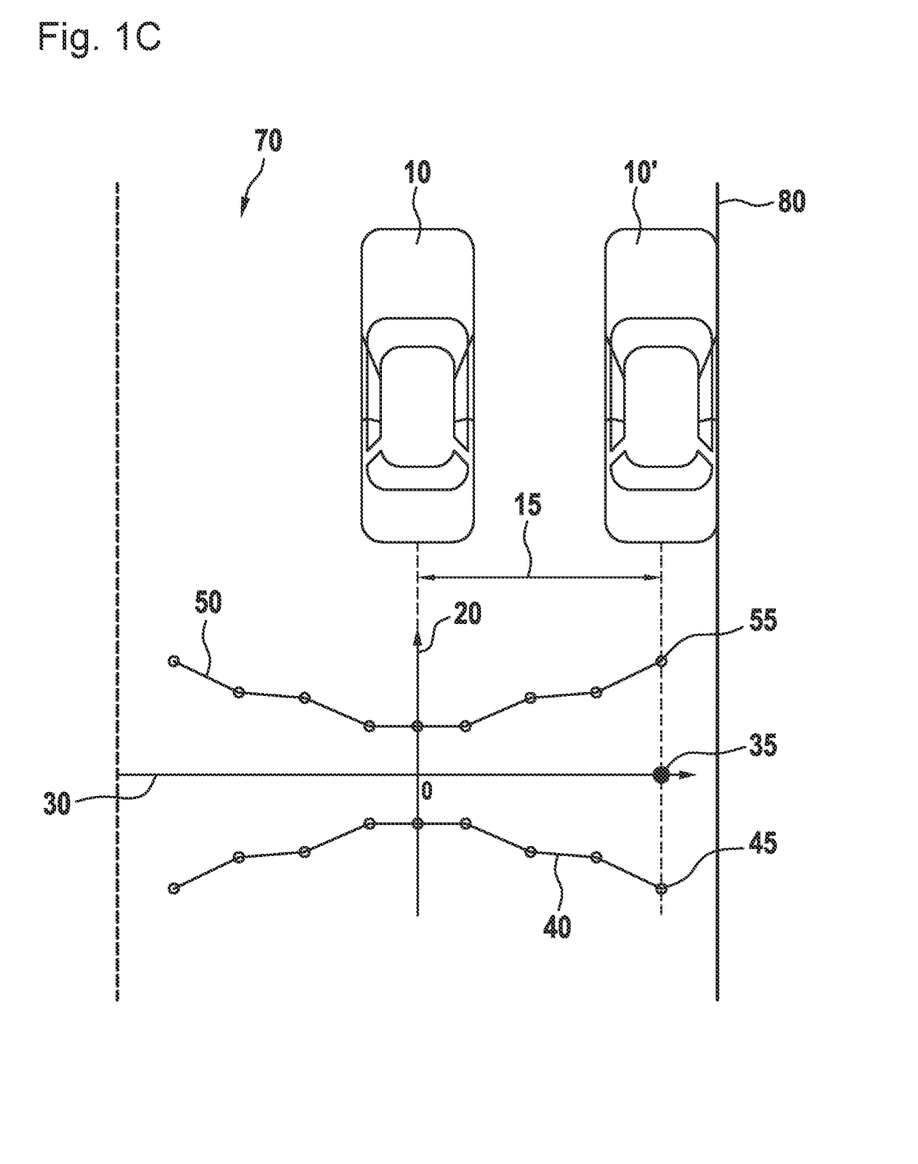
Figure 1D:
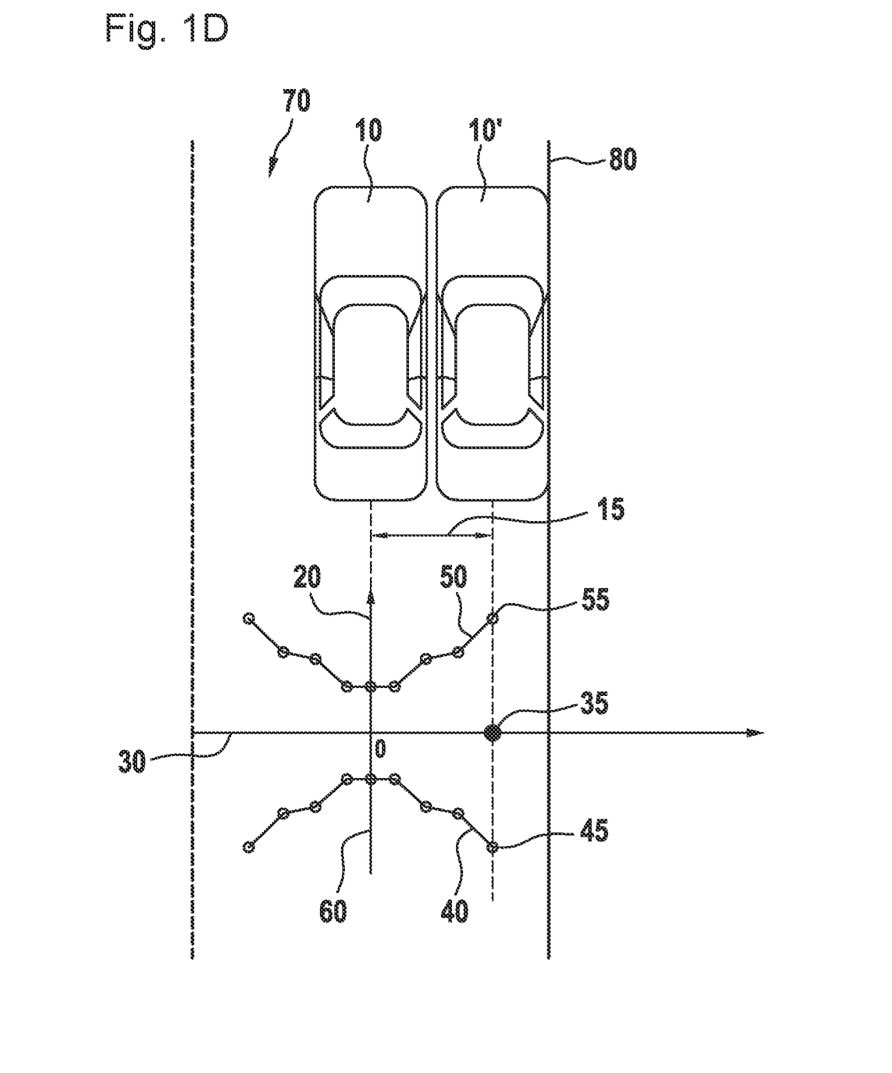

In a further alternative embodiment, which is shown in FIGS. 1C and 1D, the adaptation of the driver feedback over the distance from the lane center is implemented in such a way that upper and lower limits 40, 50, which correspond to the maximum values for the maximum values of the steering torque component provided at the respective position by the driver assistance function, are made available when the outer wheels of the vehicle are situated on the outer marking 80 of traffic lane 70. As a result, an automatic adaptation to the lane width is able to be implemented in such a way that the currently available space on the sides is taken into account. At a given distance 15, less driver feedback comes about on broad lanes such as on an expressway, see FIG. 1C, than on country roads having narrower widths, see FIG. 1D. For instance, the current lane width of the road is able to be determined with the aid of optical sensors of the vehicle, e.g., a front camera.

Figure 2A:
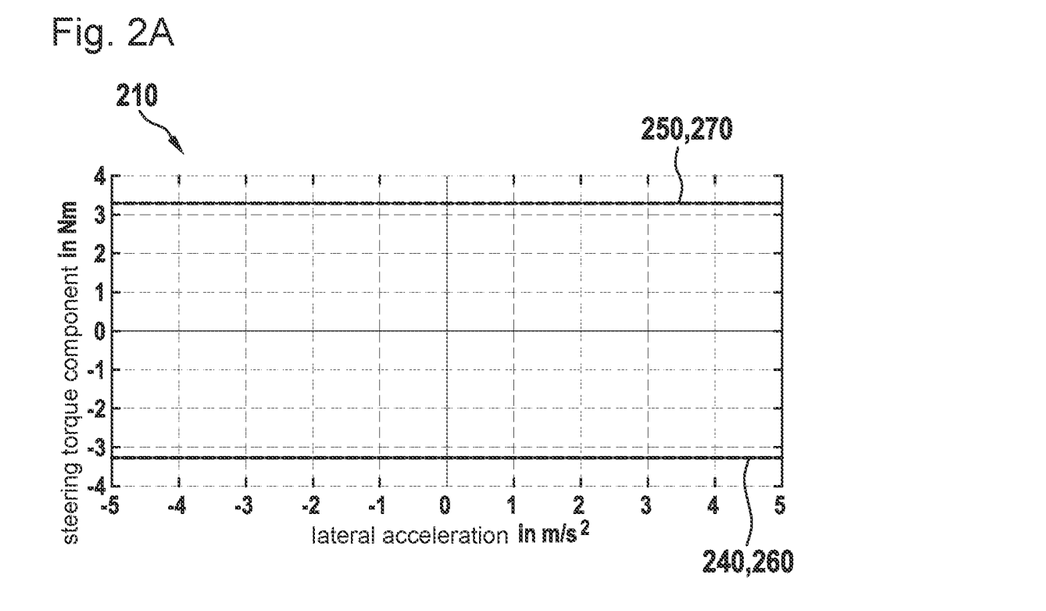
FIGS. 2A and 2B show diagrams of a permissible range for a steering torque component which a driver assistance function is able to exert on the steering of the vehicle as well as a driver feedback resulting therefrom plotted versus the lateral acceleration in each case, according to the related art.

FIG. 2A shows in a diagram 210 a permissible range for a steering torque component which a driver assistance function is able to exert on the steering of a vehicle according to the related art as a function of a lateral acceleration of the vehicle. The permissible range, defined by an upper limit 250 and a lower limit 240, corresponds to what is referred to as the controllable range for steering torque components which a driver assistance function is able to exert on the steering of a vehicle without an adverse effect on the controllability of the vehicle by the driver. This controllable range depends on the vehicle and may possibly depend on a current vehicle state such as the vehicle velocity. The controllable range is defined by an upper limit 270 and a lower limit 260.

According to the related art, the permissible range is therefore independent of a current lateral acceleration.

Figure 2B:
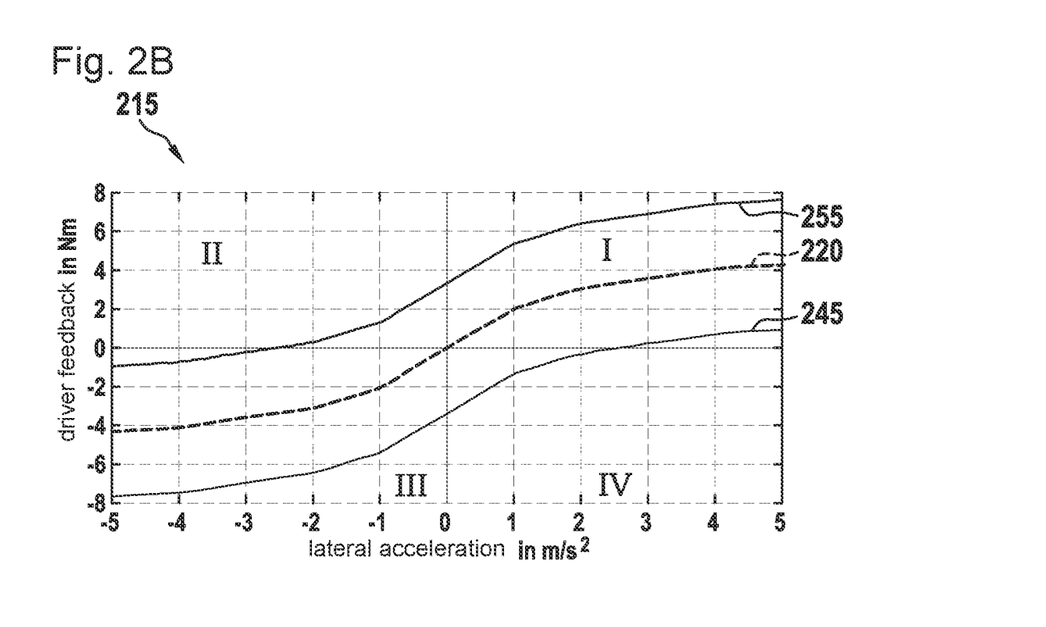

FIG. 2B shows the driver feedback resulting from the permissible range according to FIG. 2A, that is, the torque felt by the driver at the steering wheel, in the form of diagram 215. Curve 220 shows what is termed the basic steering feel, i.e., the torque perceived by the driver as a function of the current lateral acceleration, without the driver assistance function applying an additional steering torque component. Because of the linear superposition of the steering torque component of the driver assistance function with basic steering feel 220, there exists a very high feedback that is perceived as inconsistent, in particular in an overruling by the driver during cornering in the direction of the inner curve. This corresponds to curve 255 in the first quadrant I of diagram 215 and curve 245 in third quadrant III of diagram 215. This effect comes about in that the driver assistance function tries to correct the deviation from the lane center impressed by the driver and thus generates a steering torque component that has the same algebraic sign as the basic steering feel.

Figure 3A:
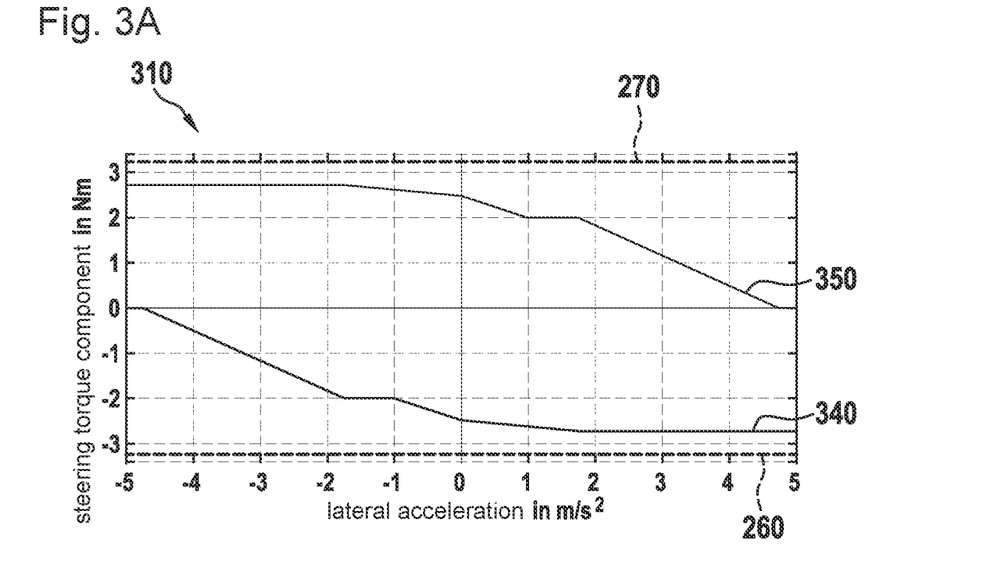
FIGS. 3A and 3B show diagrams of a permissible range for a steering torque component which a driver assistance function may exert on the steering of the vehicle as well as a driver feedback resulting therefrom plotted versus the lateral acceleration in each case, according to an example embodiment of the present invention.

In a diagram 310, FIG. 3A shows a permissible range for a steering torque component which a driver assistance function is able to exert on the steering of a vehicle according to one possible embodiment of the present invention as a function of a lateral acceleration of the vehicle. In this case, the permissible range, defined by an upper limit 350 and a lower limit 340, is developed within the controllable range for steering torque components that a driver assistance function may exert on the steering of a vehicle without an adverse effect on the controllability of the vehicle by the driver.

In the illustrated example, the limits of the permissible range are adapted to adjustable values as a function of the current lateral acceleration. In particular, there are separate adjustment possibilities for the following two driving situations during cornering:

The driver assumes the driver assistance function in the direction of the inner side of the curve. In such a case, the adaptation focuses on the particular limit of the permissible range that restricts the steering torque component in the direction of the outer curve.

The driver overrules the assistance function in the direction of the outer side of the curve. In this case, the adaptation focuses on the particular limit of the permissible range that restricts the steering torque component in the direction of the inner curve.

Figure 3B:
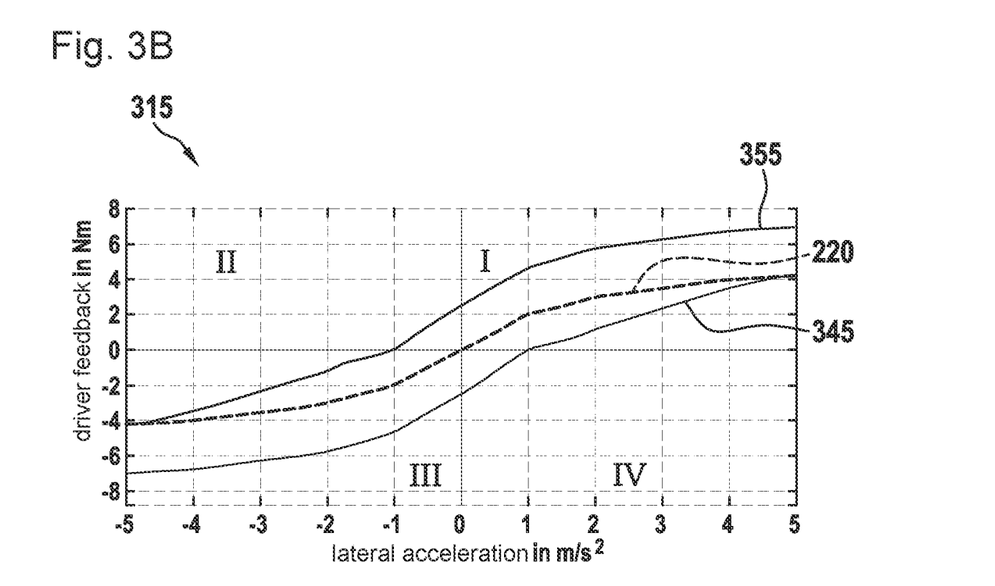

By way of example and in the form of diagram 315, FIG. 3B shows the second of these scenarios by the driver feedback resulting from the permissible range according to FIG. 3A. Curve 220 once again shows the basic steering feel, that is, the torque the driver feels as a function of the current lateral acceleration without the driver assistance function applying an additional steering torque component. Through the linear superposition of the steering torque component of the driver assistance function with basic steering feel 220, less driver feedback exists if overruling by the driver occurs during cornering in the direction of the outer curve. This corresponds to curve 345 in first quadrant I of diagram 315 and/or curve 355 in third quadrant III of diagram 315.

The separate adjustment possibilities thus allow for a freely modifiable driver feedback as a function of the driving situation. The adaptation of the permissible range in this possible embodiment does not yet allow for a direct influencing of the driver feedback because there is no compensation for the superposition with the basic steering feel.

Figure 4A:
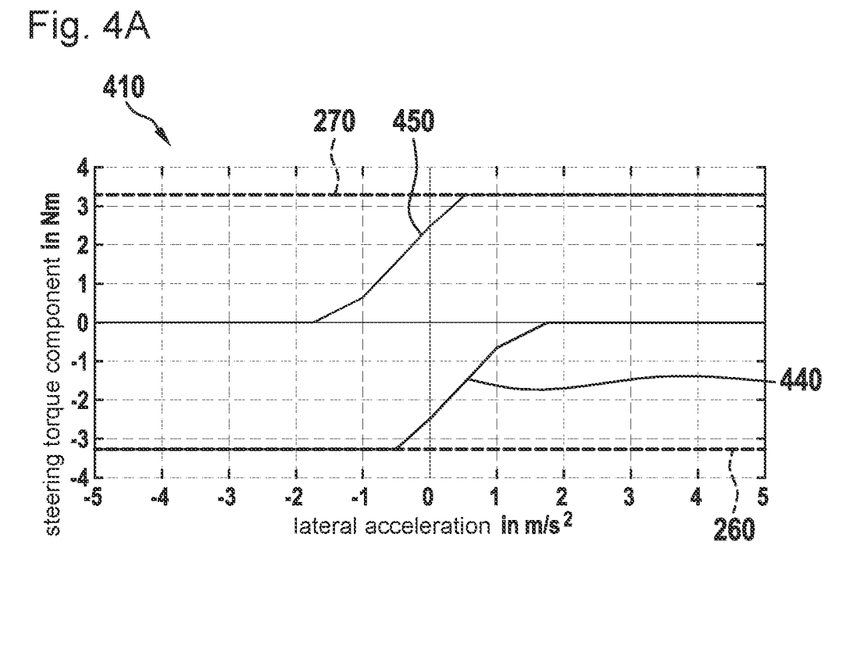
FIGS. 4A and 4B show diagrams of a permissible range for a steering torque component which a driver assistance function is able to exert on the steering of the vehicle as well as a driver feedback resulting therefrom plotted versus the lateral acceleration in each case, according to an alternative example embodiment of the present invention.
Figure 4B:
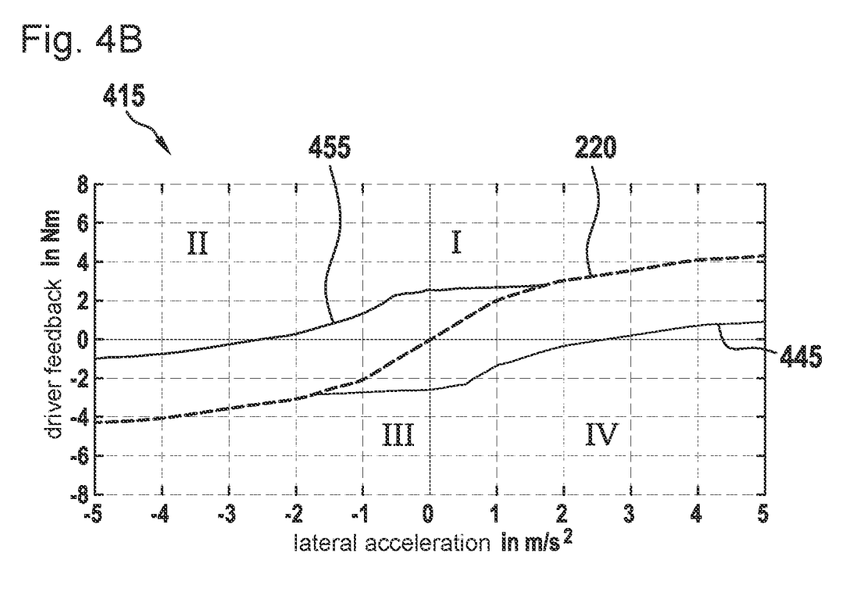

FIG. 4A shows in a diagram 410 a permissible range for a steering torque component which a driver assistance function may exert on the steering of a vehicle as a function of a lateral acceleration of the vehicle according to an alternative possible embodiment of the invention. The permissible range, defined by an upper limit 450 and a lower limit 440, is once again developed within the controllable range for steering torque components which a driver assistance function is able to exert on the steering of a vehicle without an adverse effect on the controllability of the vehicle by the driver. FIG. 4B shows resulting limits 455, 445 for the driver feedback at the steering wheel as a function of the current lateral acceleration and basic steering feel 220.

In the embodiment according to FIGS. 4A and 4B, a correction of the permissible range is implemented by a disturbance feedforward control. In general, the driver feedback at the steering wheel results from the superposition of the steering torque component of the driver assistance function and the basic steering feel. Since the resulting overall steering torque is decisive for the subjective assessment of the driver feedback, a direct superposition of the steering torque components without further measures is perceived as inconsistent. Therefore, in this example, a correction of the permissible range by basic steering feel 220 with the aid of the additional steering torque component is configured with regard to the driver feedback desired as to the vehicle state. FIG. 4B illustrates the effect of this correction, which now allows for a direct influencing of the driver feedback and in particular also reduces the extremely strong driver feedback when the driver overrules the assistance function in the direction of the inside of the curve. This corresponds to curve 445 in first quadrant I of diagram 415 and curve 455 in third quadrant III of diagram 415. For this purpose, the representation of basic steering feel 220 is able to be stored as a function of the vehicle velocity in the form of a characteristic curve.

Figure 5:
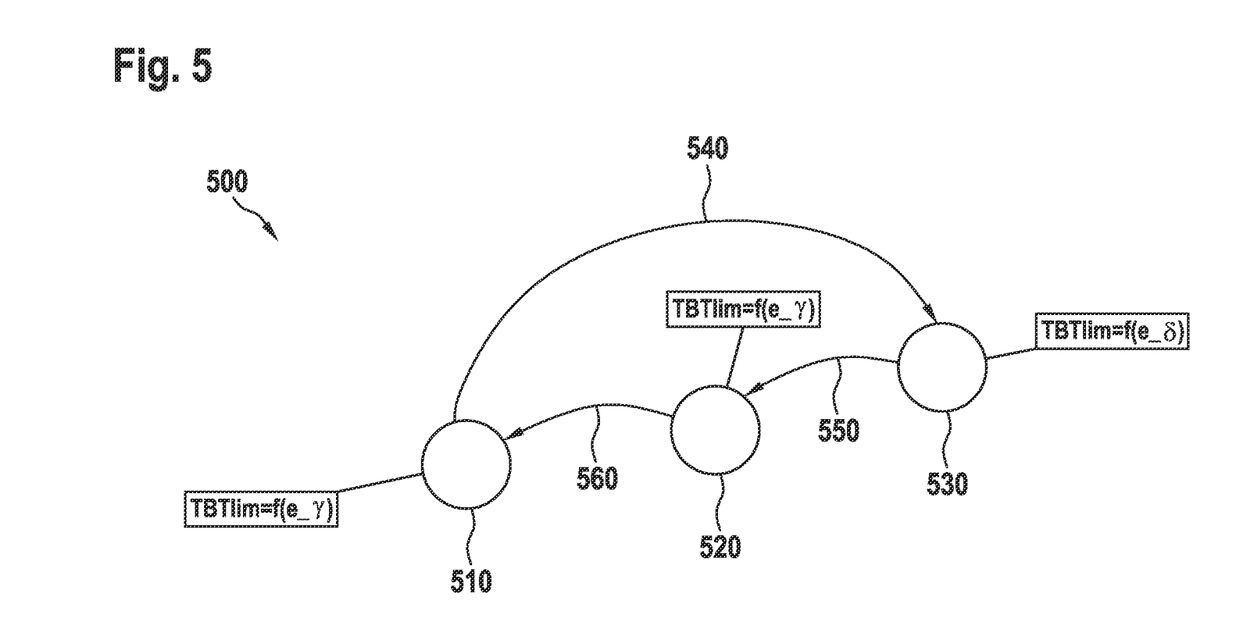
FIG. 5 shows an example sequence of a method according to an exemplary embodiment of the present invention as a finite automaton as a function of the driver activity.

FIG. 5 shows an exemplary embodiment of the present invention in which a change to a separate mode is made in the case of a limited steering activity of the driver. In this mode, the specification of the permissible range is made independently of the vehicle state. The embodiment is shown as a finite automaton 500 as a function of the driver activity. In a state 510 in which the driver executes a measurable steering activity, the driver interaction is limited by a permissible range TBTlim for a steering torque component which the driver assistance function is able to exert on the steering of the vehicle and which is a function of the current vehicle state, i.e., the current vehicle position relative to a lane center and/or the current lateral velocity and/or the current lateral acceleration of the vehicle such as described by way of example in connection with FIGS. 1A-1D, 3A and 3B, and 4A and 4B, and exemplarily described here by function TBTlim=f(e_y). If it is determined according to check 540 that the steering torque |TBT| exerted by the driver is lower than a defined threshold value Thd for a certain period of time, then the system transitions to state 530. In state 530, permissible range TBTlim is specified not with regard to the driver feedback but with regard to ensuring the trajectory guidance task, TBTlim=f(e_δ). When the steering torque |TBT| exerted by the driver becomes greater again than defined threshold value Thd for a certain period of time, the system transitions to state 520 in which permissible range TBTlim for a steering torque component which the driver assistance function is able to exert on the steering of the vehicle depends on the current vehicle state again. After a certain period of time, the system returns to its initial state 510. The functions according to which permissible range TBTlim for a steering torque component which the driver assistance function may exert on the steering of the vehicle state is a function of a current vehicle state may differ for states 520 and 510 or be the same.

A transition back from separate state 530 takes place as soon as an increased steering activity of the driver is present. An adjustable time window and an activation threshold, in particular, are employed for the transitions in each case in an effort to increase the robustness with regard to sensor noise and road irregularities.

What is claimed is:

1. A method for operating a driver assistance function to support a lateral guidance of a vehicle, the method comprising:
predefining, within a controllable range, a permissible range for a steering torque component which the driver assistance function is able to exert on the steering of the vehicle, and the permissible range of a steering torque component being specified by a permissible upper limit and a permissible lower limit; and
adapting the permissible upper limit and the permissible lower limit as a function of a current vehicle state;
wherein the permissible range is within the controllable range, and
wherein the controllable range is a constant range of controllable steering torques, and is defined by a constant upper limit and a constant lower limit.

2. The method as recited in claim 1, wherein the current vehicle state includes a current position of the vehicle relative to the lane center of the road, respective values of the permissible upper limit and the permissible lower limit being adjusted to be greater with increasing distance of the vehicle from the lane center of the road.

3. The method as recited in claim 1, wherein the current vehicle state includes a current position of the vehicle relative to the lane center of the road, and respective values of the permissible upper limit and the permissible lower limit initially increasing with an increasing distance of the vehicle from the lane center of the road and decrease again starting from a certain distance of the vehicle from the lane center of the road.

4. The method as recited in claim 2, wherein maximum values for the permissible upper limit and the permissible lower limit are provided whenever outer wheels of the vehicle are situated on an outer marking of a traffic lane.

5. The method as recited in claim 1, wherein the current vehicle state includes a current velocity of the vehicle relative to a lane center of the road, the current velocity being a current velocity in a lateral direction.

6. The method as recited in claim 1, wherein the current vehicle state includes a current lateral acceleration of the vehicle.

7. The method as recited in claim 1, wherein the current vehicle state includes a current sudden motion of the vehicle in a lateral direction.

8. The method as recited in claim 1, wherein the current vehicle state includes a steering activity of a driver of the vehicle.

9. The method as recited in claim 8, wherein the steering activity of the driver of the vehicle is acquired and a separate mode of the driver assistance function is activated as a function of the acquired steering activity of the driver, and certain values are predefined in the separate mode for the permissible upper limit and the permissible lower limit of the permissible range for the steering torque component which the driver assistance function is exertable on the steering of the vehicle for a certain period of time independently of a current position, a current velocity, a current acceleration or a motion of the vehicle when a low steering activity was detected.

10. The method as recited in claim 1, wherein the permissible range for the steering torque component of the driver assistance function is specified by a disturbance feedforward control in the form of a basic steering feel of the vehicle, the basic steering feel being ascertained from a stored characteristic map or based on a computation model, as a function of a velocity of the vehicle.

11. A control apparatus for a driver assistance system, comprising:
a control unit configured to operate a driver assistance function to support a lateral guidance of a vehicle, by performing the following:
predefining, within a controllable range, a permissible range for a steering torque component which the driver assistance function is able to exert on the steering of the vehicle, and the permissible range of a steering torque component being specified by a permissible upper limit and a permissible lower limit; and
adapting the permissible upper limit and the permissible lower limit as a function of a current vehicle state;
wherein the permissible range is within the controllable range, and
wherein the controllable range is a constant range of controllable steering torques, and is defined by a constant upper limit and a constant lower limit.

12. A driver assistance system for a vehicle, comprising:
a control unit configured to operate a driver assistance function to support a lateral guidance of a vehicle, by performing the following:
predefining, within a controllable range, a permissible range for a steering torque component which the driver assistance function is able to exert on the steering of the vehicle, and the permissible range of a steering torque component being specified by a permissible upper limit and a permissible lower limit; and
adapting the permissible upper limit and the permissible lower limit as a function of a current vehicle state;
wherein the permissible range is within the controllable range, and
wherein the controllable range is a constant range of controllable steering torques, and is defined by a constant upper limit and a constant lower limit.

13. A non-transitory computer-readable data carrier, on which is stored a computer program, which is executable by a processor, comprising:
a program code arrangement including program code for operating a driver assistance function for at least partially automated control of a lateral guidance of a vehicle, by performing the following:
predefining, within a controllable range, a permissible range for a steering torque component which the driver assistance function is able to exert on the steering of the vehicle, and the permissible range of a steering torque component being specified by a permissible upper limit and a permissible lower limit; and
adapting the permissible upper limit and the permissible lower limit as a function of a current vehicle state;
wherein the permissible range is within the controllable range, and
wherein the controllable range is a constant range of controllable steering torques, and is defined by a constant upper limit and a constant lower limit.

14. The non-transitory computer-readable data carrier as recited in claim 13, wherein the permissible upper limit and permissible lower limit of the permissible range for the steering torque component which the driver assistance function may exert on the steering of the vehicle is specified independently of the current vehicle state, and wherein the current vehicle state includes a current position, a current velocity, a current acceleration, or a motion of the vehicle relative to a lane center of a road.

15. The non-transitory computer-readable data carrier as recited in claim 13, wherein based on the vehicle state and a lateral acceleration, an adjustable range of a driver feedback is determined.

16. The method as recited in claim 1, wherein the permissible upper limit and permissible lower limit of the permissible range for the steering torque component which the driver assistance function may exert on the steering of the vehicle is specified independently of the current vehicle state, and wherein the current vehicle state includes a current position, a current velocity, a current acceleration, or a motion of the vehicle relative to a lane center of a road.

17. The method as recited in claim 1, wherein based on the vehicle state and a lateral acceleration, an adjustable range of a driver feedback is determined.

18. The control apparatus as recited in claim 11, wherein the permissible upper limit and permissible lower limit of the permissible range for the steering torque component which the driver assistance function may exert on the steering of the vehicle is specified independently of the current vehicle state, and wherein the current vehicle state includes a current position, a current velocity, a current acceleration, or a motion of the vehicle relative to a lane center of a road.

19. The control apparatus as recited in claim 11, wherein based on the vehicle state and a lateral acceleration, an adjustable range of a driver feedback is determined.

20. The driver assistance system as recited in claim 12, wherein the permissible upper limit and permissible lower limit of the permissible range for the steering torque component which the driver assistance function may exert on the steering of the vehicle is specified independently of the current vehicle state, and wherein the current vehicle state includes a current position, a current velocity, a current acceleration, or a motion of the vehicle relative to a lane center of a road.

21. The driver assistance system as recited in claim 12, wherein based on the vehicle state and a lateral acceleration, an adjustable range of a driver feedback is determined.

* * * * *